US011454555B2

(12) United States Patent
Fortgens et al.

(10) Patent No.: US 11,454,555 B2
(45) Date of Patent: Sep. 27, 2022

(54) FORCE SENSOR APPARATUS AND A METHOD OF ASSEMBLING THE SAME

(71) Applicant: SENSATA TECHNOLOGIES, INC., Attleboro, MA (US)

(72) Inventors: Laurens C. Fortgens, Odijk (NL); Jan-Willem Sloetjes, Foxboro, MA (US); Edwin Vonk, Enschede (NL); Ruben Auer, Providence, RI (US); Thomas Gerjen Hendrik Kouwen, Nieuwleusen (NL); Cristobal Ruiz Zwollo, Enschede (NL)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 311 days.

(21) Appl. No.: 16/745,326

(22) Filed: Jan. 16, 2020

(65) Prior Publication Data
US 2021/0223120 A1    Jul. 22, 2021

(51) Int. Cl.
*G01L 1/14* (2006.01)
*G01L 1/22* (2006.01)
(Continued)

(52) U.S. Cl.
CPC ............ *G01L 1/142* (2013.01); *G01L 1/2237* (2013.01); *B60T 17/221* (2013.01); *F16D 66/00* (2013.01); *F16D 2066/005* (2013.01)

(58) Field of Classification Search
CPC ......... G01L 1/142; G01L 1/2237; G01L 1/18; G01L 1/22; G06F 3/016; G06F 3/0414;
(Continued)

(56) References Cited

U.S. PATENT DOCUMENTS 7,364,020 B2    4/2008 Ante et al.
8,733,182 B2    5/2014 Huizinga et al.
(Continued)

FOREIGN PATENT DOCUMENTS

DE    10350085 A1    6/2005
EP    2546625 A1    1/2013
GB    2147426 A    5/1985

OTHER PUBLICATIONS

International Search Report and Written Opinion, PCT/US2021/013034, dated Jun. 25, 2021, 20 pages.

*Primary Examiner* — Octavia Davis Hollington
(74) *Attorney, Agent, or Firm* — Mark H. Williams

(57) ABSTRACT

In a particular embodiment, a force sensor apparatus is disclosed that includes a force-compliant element that deforms in response to forces applied to the force sensor apparatus. The apparatus also includes a sensing element coupled to the force-compliant element and is configured to generate a signal indicating the degree that the force-compliant element deforms in response to the applications of forces to the force sensor apparatus. In this embodiment, the apparatus also includes a printed circuit board configured to receive the signal from the sensing element and a support structure having a surface on which the printed circuit board is coupled. The support structure has an outer rim that is attached to the force-compliant element. The apparatus also includes a sensor housing that covers the printed circuit board. The sensor housing has an outer rim attached to the force-compliant element.

31 Claims, 14 Drawing Sheets

(51) Int. Cl.
*B60T 17/22* (2006.01)
*F16D 66/00* (2006.01)

(58) Field of Classification Search
CPC ..... G06F 3/03545; B60B 9/24; B60T 17/221; F16D 66/00; F16D 2066/005
USPC .................................................. 73/862.626
See application file for complete search history.

(56) References Cited

U.S. PATENT DOCUMENTS

| | | |
|---|---|---|
| 9,714,876 B2 | 7/2017 | Huo et al. |
| 2005/0284238 A1 | 12/2005 | Wilkie et al. |
| 2013/0014595 A1* | 1/2013 | Huizinga .................. G01L 5/22 |
| | | 73/862.045 |
| 2017/0268938 A1 | 9/2017 | Petersen et al. |

* cited by examiner

Attach A Printed Circuit Board (PCB) Having Electrical Components To A Support Ring 1202

Electrically Couple The Electrical Components Of The PCB To At Least Two Sensing Elements On A Force Ring 1204

Attach The Support Ring To The Force Ring 1206

Position A Sensor Cap Over The PCB, The Support Ring, And The Force Ring 1208

Attach The Sensor Cap To The Force Ring 1210

```
┌─────────────────────────────────────────────────────────────────────┐
│ Attach A Printed Circuit Board (PCB) Having Electrical Components To A Support Ring │
│                                  1202                                │
└─────────────────────────────────────────────────────────────────────┘
                                    │
                                    ▼
┌─────────────────────────────────────────────────────────────────────┐
│ Electrically Couple The Electrical Components Of The PCB To At Least Two Sensing │
│                     Elements On A Force Ring 1204                    │
└─────────────────────────────────────────────────────────────────────┘
                                    │
                                    ▼
┌─────────────────────────────────────────────────────────────────────┐
│ Place A Circular Environmental Seal Between An Inner Rim Of The Sensor Cap And An │
│                   Inner Rim Of The Force Ring 1302                   │
└─────────────────────────────────────────────────────────────────────┘
                                    │
                                    ▼
┌─────────────────────────────────────────────────────────────────────┐
│              Attach The Support Ring To The Force Ring 1206          │
└─────────────────────────────────────────────────────────────────────┘
                                    │
                                    ▼
┌─────────────────────────────────────────────────────────────────────┐
│  Position A Sensor Cap Over The PCB, The Support Ring, And The Force Ring 1208  │
└─────────────────────────────────────────────────────────────────────┘
                                    │
                                    ▼
┌─────────────────────────────────────────────────────────────────────┐
│               Attach The Sensor Cap To The Force Ring 1210           │
└─────────────────────────────────────────────────────────────────────┘
```

FIG. 13

Attach A Printed Circuit Board (PCB) Having Electrical Components To A Support Ring 1202

Electrically Couple The Electrical Components Of The PCB To At Least Two Sensing Elements On A Force Ring 1204

Attach The Support Ring To The Force Ring 1206

Position A Sensor Cap Over The PCB, The Support Ring, And The Force Ring 1208

Attach The Sensor Cap To The Force Ring 1210

Attach An Interface Ring To The Force Ring 1402

FIG. 14

FORCE SENSOR APPARATUS AND A METHOD OF ASSEMBLING THE SAME

BACKGROUND

Force sensors are often used to control or regulate a force that is applied to a component. In one type of force sensor, the force sensor is positioned in such a way that forces to be measured act on the sensor. The force sensor may be configured to transform a measurement of forces into an electrical signal for further use in the control or regulation of the forces. This type of force sensor may be used in a variety of applications, such as for measuring braking force of electromechanical brakes in automobiles. For example, a force-compliant element of the force sensor may be coupled to some component of the braking system and as forces are applied, the force-compliant element temporarily deforms. In this example, the strain on the force-compliant element may be measured and used to generate an electrical signal that is indicative of the forces acting on the component of the braking system.

SUMMARY

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

In a particular embodiment, a force sensor apparatus is disclosed that includes a force-compliant element that deforms in response to forces applied to the force sensor apparatus. The apparatus also includes a sensing element coupled to the force-compliant element and configured to generate a signal indicating the degree that the force-compliant element deforms in response to the application of forces to the force sensor apparatus. In this embodiment, the apparatus also includes a printed circuit board configured to receive the signal from the sensing element and a support structure having a surface on which the printed circuit board is coupled. The support structure has an outer rim that is attached to the force-compliant element. The apparatus also includes a sensor housing that covers the printed circuit board. The sensor housing has an outer rim attached to the force-compliant element.

In another embodiment, a force sensor apparatus is disclosed that includes a force ring configured to deform in response to applications of forces to the force sensor apparatus. The force ring has a plurality of sensing elements configured to produce an electrical signal that is indicative of the amount of deformation in the force ring. The apparatus also includes a printed circuit board configured to process the electrical signal from the force ring. In this embodiment, the apparatus also includes a sensor cap covering the printed circuit board and a portion of the force ring. The sensor cap has an inner rim and an outer rim attached to the force ring. The apparatus also includes a circular environmental seal between the inner rim of the sensor cap and the inner rim of the force ring.

In a particular embodiment, a method of assembling a force sensor apparatus is disclosed. The method includes attaching a printed circuit board (PCB) having electrical components to a support ring; electrically coupling the electrical components of the PCB to at least two sensing elements on a force ring, the at least two sensing elements configured to measure forces applied to the force sensor apparatus; attaching the support ring to the force ring; positioning a sensor cap over the PCB and the support ring; and attaching the sensor cap to the force ring.

BRIEF DESCRIPTION OF THE DRAWINGS

FIG. 13 is a flowchart to illustrate another implementation of a method for assembling a force sensor apparatus according to embodiments of the present disclosure; and FIG. 14 is a flowchart to illustrate another implementation of a method for assembling a force sensor apparatus according to embodiments of the present disclosure.

DETAILED DESCRIPTION

Figure 1:
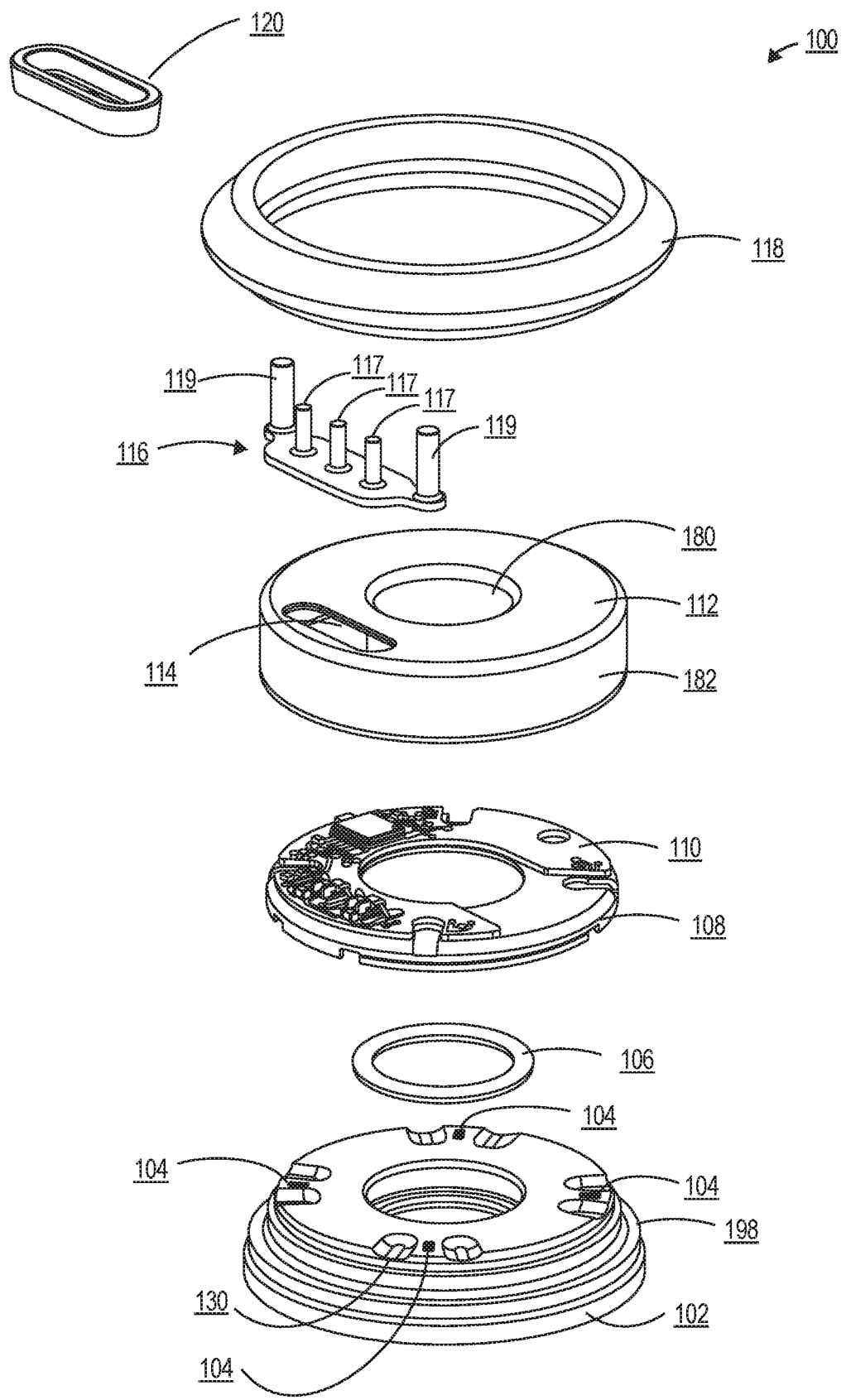
FIG. 1 is a diagram illustrating an exploded view of a force sensor apparatus according to embodiments of the present disclosure.

The advantages, and other features of the systems and methods disclosed herein, will become more readily apparent to those having ordinary skill in the art from the following detailed description of certain embodiments taken in conjunction with the drawings which set forth representative embodiments of the present invention.

In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Further, words defining orientation such as "upper", "lower", "inner", and "outer" are merely used to help describe the location of components with respect to one another. For example, an "inner" surface of a part is merely meant to describe a surface that is separate from the "outer" surface of that same part. No words denoting orientation are used to describe an absolute orientation (i.e., where an "inner" part must always be inside a part).

Note that techniques herein are well suited for use in any type of sensor application such as force sensor assemblies as discussed herein. However, it should be noted that embodiments herein are not limited to use in such applications and that the techniques discussed herein are well suited for other applications as well.

FIG. 1 is a diagram illustrating an exploded view of a force sensor apparatus (100) according to embodiments of the present disclosure. The apparatus (100) of FIG. 1 includes a force-compliant element (102) configured to deform in response to forces applied to the force sensor apparatus. In a particular embodiment, the force-compliant element (102) has a first surface arranged to receive a first force. As will be explained below, the force-compliant element is connected with an interface structure (118) that is arranged to receive a second force opposite in direction to the first force, such that the force-compliant element deforms in response to the application of the first force and the second force on the force sensor apparatus (100). In a particular embodiment, the force-compliant element (102) is a piece of material, such as metal or plastic, that deforms in response to applications of forces. For example, the force-compliant element (102) may be a ring-shaped metal disk. Readers of skill in the art will realize that the force-compliant element (102) may be produced using a variety of methods and techniques including but not limited to turned and milled and metal injection molding.

The apparatus (100) of FIG. 1 also includes four sensing elements (104) coupled to the force-compliant element (102). In a particular embodiment, the top surface of the force-compliant element (102) is prepared to provide a good attachment surface for the sensing elements (104). For example, the top surface of the force-compliant element (102) may be sand-blasted. Each of the sensing elements (104) is configured to generate a signal indicating the degree that the force-compliant element (102) deforms in response to the application of forces on the apparatus (100). In a particular embodiment, the sensing elements are micro-fused silicon strain gauges (MSG). In order to measure the amount of force applied to the force-compliant element, the sensing elements may be evenly distributed on a circle on a top surface of the force-compliant element (102). Readers of skill in the art will realize that any number of sensing elements may be used in accordance with the present disclosure (including a particular embodiment in which a single gauge is used as the sensing element). The force-compliant element may include one or more grooves to help control the strain field which the sense element measures. In the example of FIG. 1, the force-compliant element (102) includes a plurality of grooves (130). Alternatively, the force-compliant element may include no grooves.

In addition, the apparatus (100) of FIG. 1 also includes a printed circuit board (PCB) (110) on which electrical components (e.g., integrated circuits, and passive elements such as resistors, capacitors, etc.) are positioned and configured to receive the signal from the sensing elements (104). In the example of FIG. 1, the PCB is C-shaped and only covers a portion of the underlying support structure (108). Having a C-shaped PCB may allow the PCB to be nested within the stack of the components of the force sensor apparatus and therefore enable more compact assembly of the force sensor apparatus.

In the force sensor apparatus (100) of FIG. 1, the support structure (108) has a surface on which the PCB (110) is coupled. The support structure may be made of many types of material, such as metal and plastic, that is suitable for supporting the PCB (110). In the example of FIG. 1, the support structure (108) are positioned in a stack of the components of the force sensor apparatus (100) to rest on the force-compliant element (102). The support structure (108) may also include openings (not pictured) through which the components of the PCB may be coupled to the sensing elements. In this example, the openings in the support structure (108) may align with positions of bonding pads on the PCB (110), so that the contacts on the sensing elements (104) may be bonded to the bonding pads on the PCB (110). After forming this electrical connection of the sensing elements (104) to the electrical components on the PCB (110), the sensing elements (104) may be covered with a protective material (e.g., a gel like material) in the voids provided by the openings in the support structure (108).

In addition, the apparatus (100) of FIG. 1 also includes a sensor housing (112) that covers the PCB (110). In the example of FIG. 1, the sensor housing (112) has an inner rim (180) and an outer rim (182). As will be explained in further detail below, the sensor housing (112) is designed to protect the electrical components of the force sensor apparatus (100). The apparatus (100) of FIG. 1 also includes an environmental seal ring (106), which when placed between the sensor housing (112) and the force-compliant element (102), ensures that the internal components of the force sensor apparatus (100) are protected. In the example of FIG. 1, the environmental seal ring is an O-ring, but readers of the skill in the art will realize that a number of other shapes and configurations, such as D-rings and potting compounds, may be used to provide a seal from the environment. Using an environmental seal may allow the sensor housing to be assembled and sealed to the force-compliant element without having to weld or otherwise couple the inner rim of the sensor housing to the force-compliant element. Sealing the sensor housing (112) and the force-compliant element (102) with an environmental seal (106) instead of welding the inner rims of the sensor housing (112) and the force-compliant element (102) together may reduce the complexity and cost of assembling the apparatus (100).

The apparatus (100) of FIG. 1 also includes an electrical connector assembly (116) that is aligned for positioning within an opening (114) of the sensor housing (112). In the example of FIG. 1, the electrical connector assembly (116) includes a plurality of electrical connection pins (117) for transmitting a signal to an external component (not pictured). The electrical connector assembly (116) also includes a plurality of mechanical orientation features (119) for aligning the apparatus with an external component (not pictured). In a particular embodiment, the mechanical orientation features are part of the sensor housing (112). In another embodiment, the mechanical orientation features are part of the force-compliant element (102).

In a particular embodiment, the electrical connector assembly (116) is mechanically connected and environmentally sealed to the sensor housing (112). For example, a weld may be used to environmentally seal the electrical connector assembly (116) to the sensor housing (112). In the example of FIG. 1, the apparatus (100) includes a gasket (120) for sealing the electrical connector assembly (116) to a counterpart component. Using a glass seal and a gasket may allow the electrical connector assembly (116) to be environmentally sealed with the counterpart component without using additional seals.

In addition, the apparatus (100) of FIG. 1 includes an interface structure (118) that distributes a load to the force-compliant element (102) when the interface structure (118) is attached to the force-compliant element (102). In the example of FIG. 1, the interface structure (118) is a ring or interface ring that when coupled to the force-compliant element (102), evenly distributes the load to the force-compliant element (102), so that the sensing elements (104) can accurately measure the load on the force-compliant element. The interface structure (118) may also be used to create an interface for coupling the force sensor apparatus (100) to a component that provides a force to the force-compliant element (102). For example, the interface structure (118) may be used to fix the apparatus (100) to a caliper of an electromechanical braking system. In this example, the force-compliant element (102) may be coupled to a piston of the electromechanical braking system. Continuing with this example, forces from both the piston and the caliper are applied to the components of the apparatus (100) including the force-compliant element. As explained above, the applications of these forces may result in the force-compliant element (102) temporarily deforming. In this example, the sensing element (104) may generate an electrical signal having properties that are commensurate with the amount of deformation in the force-compliant element (102).

Figure 2:
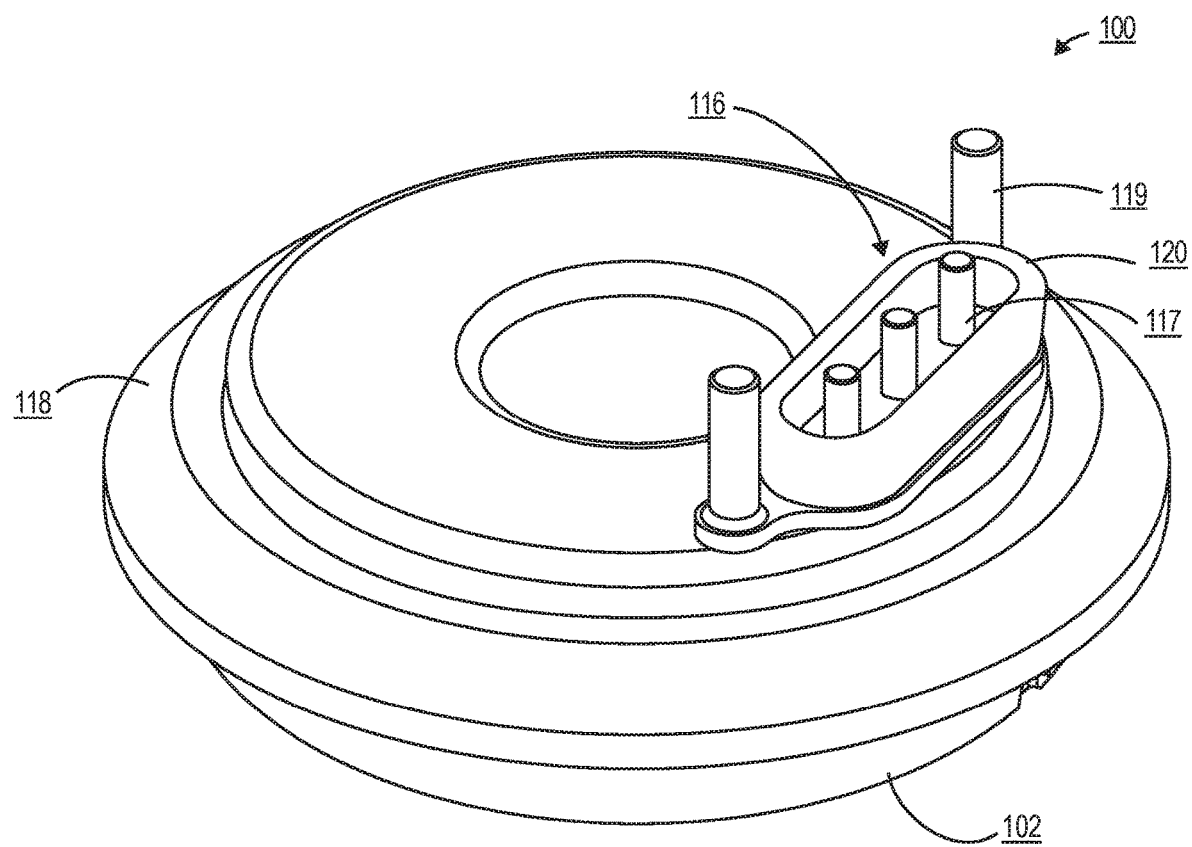
FIG. 2 is a diagram illustrating an isometric view of the force sensor apparatus of FIG. 1 after assembly.

FIG. 2 is a diagram illustrating an isometric view of the force sensor apparatus of FIG. 1 after assembly. In the assembled state, the force-compliant element (102) is visible, as well as the sensor housing (112), the interface structure (118), the electrical connector assembly (116), the mechanical orientation features (119), and the gasket (120).

Figure 3:
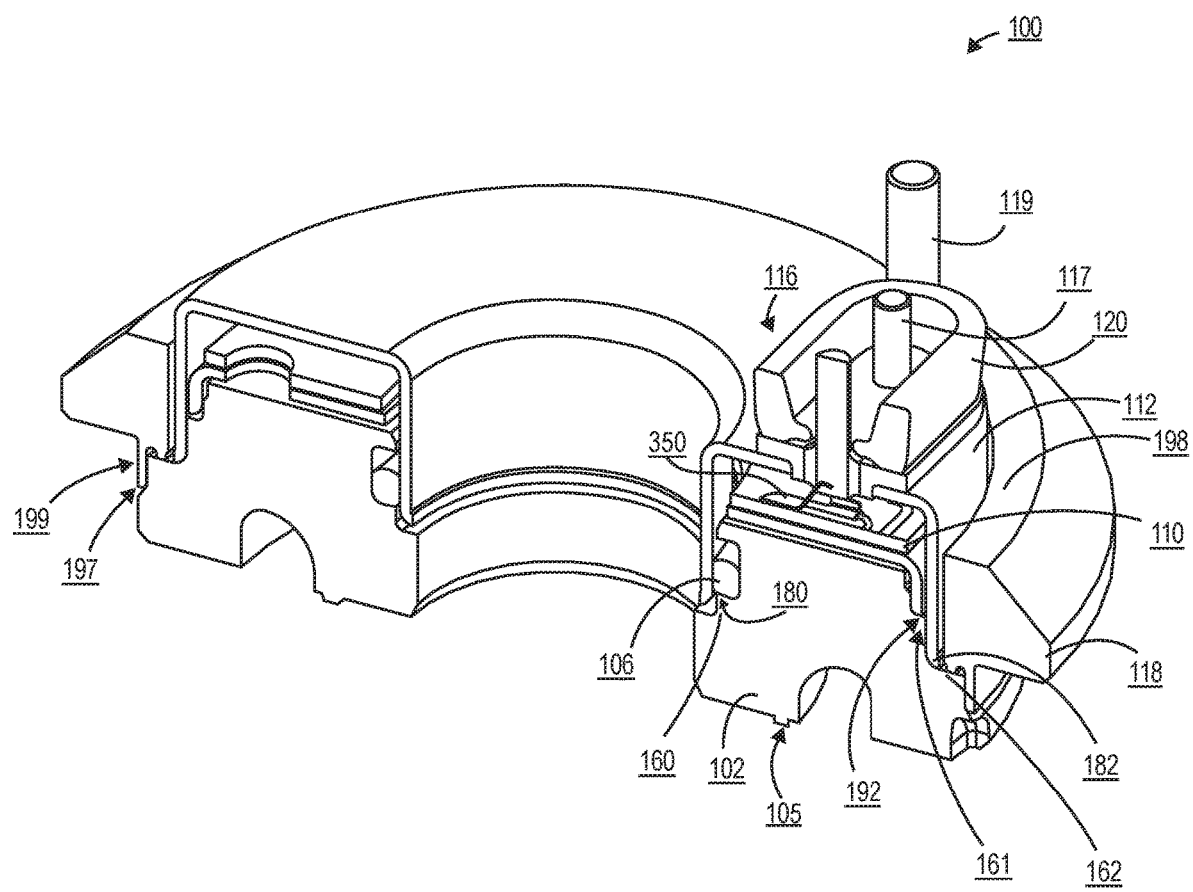
FIG. 3 is a diagram illustrating a partial cross-section view of the force sensor apparatus of FIG. 1 after assembly.

FIG. 3 is a diagram illustrating a partial cross-section view of the force sensor apparatus of FIG. 1 after assembly. Assembling the force sensor apparatus (100) may include attaching the printed circuit board (PCB) (110) to the support structure (108). For example, the PCB (110) may be attached to the support structure using soldering, glue, adhesive, or tape. Assembling the force sensor apparatus may also include electrically coupling the electrical components of the PCB to the sensing elements (104) on the force measuring element (102). As explained above, the sensing elements (104) may be configured to measure a force applied to the force-compliant element (102) and generate an electrical signal. This electrical signal may be then be transmitted from the sensing elements (104) to the PCB (110).

To assemble the force sensor apparatus, the outer rim (192) of the support structure (108) may be attached to the outer rim (161) of the force-compliant element (102). In the example of FIG. 3, the housing (112) is positioned over the PCB (110) and the support structure (108), and an outer rim (182) of the housing (112) is attached to another outer rim (162) of the force-compliant element (102).

Assembling the force sensor apparatus (100) may also include placing the environmental seal (106) between an inner rim (180) of the housing (112) and an inner rim (160) of the force-compliant element (102); and coupling the sensor housing (112) to the force-compliant element (102). In a particular embodiment, the sensor housing (112) is coupled to the force-compliant element (102) by one of welding, press-fitting, or with an adhesive. Using an environmental seal (106) to seal the inner rim of the sensor housing (112) and the inner rim of the force-compliant element (102), may allow the force sensor apparatus (100) to be assembled without welding or otherwise connecting the inner rims of the force-compliant element (102) and the sensor housing (112). As explained above, sealing the sensor housing (112) and the force-compliant element (102) with an environmental seal (106) instead of welding the inner rims of the sensor housing (112) and the force-compliant element (102) together may reduce the complexity and cost of assembling the apparatus (100).

The electrical pins (117) are coupled to the electrical components of the PCB (110). In the example of FIG. 3, a lead (350) electrically couples an electrical component of the PCB to one of the pins (117) of the electrical connector assembly (116). The electrical connector assembly (116) extends through an opening (e.g., the opening (114) shown in FIG. 1) of the sensor housing (112) such that the pins (117) and the orientation features (119) of the electrical connector assembly (116) are accessible to an outside component (not shown).

Furthermore, assembling the force sensor apparatus may include attaching the interface structure (118) to the force-compliant element (102). In the example of FIG. 3, the inner rim (199) of the interface structure (118) is welded to an outer rim (197) of the force-compliant element (102). As explained above, the interface structure enables an even distribution of force to the force-compliant elements. In the example of FIG. 3 the interface structure (118) includes a force-receiving surface (198) for receiving a force from the component. Because the interface structure (118) is coupled to the force-compliant element (102), the force received at the force-receiving surface (198) is applied to the force-compliant element (102) and is a counter force to the force that the force-compliant element (102) receives at a force-receiving surface (105) on the force-compliant element (102).

The interface structure also enables an application specific attachment to a component. For example, the interface structure may be used to fix the apparatus to a caliper of an electromechanical braking system. In this example, the force-compliant element (102) may be coupled to a piston of the electromechanical braking system. Continuing with this example, forces from both the piston and the caliper are applied to the components of the apparatus including the force-compliant element. Specifically, as the piston moves relative to the caliper, a first force is applied to the force-compliant element (102). The caliper provides a second force counter to the first force on the interface ring. As explained above, the applications of these forces may result in the force-compliant element temporarily deforming. In this example, the sensing element (104) may generate an electrical signal having properties that are commensurate with the amount of deformation in the force-compliant element. This signal may be provided to the PCB, which process the signal and generates an output that may be transmitted to another component (not pictured) via the pins (117) of the electrical connector assembly (116).

Figure 4:
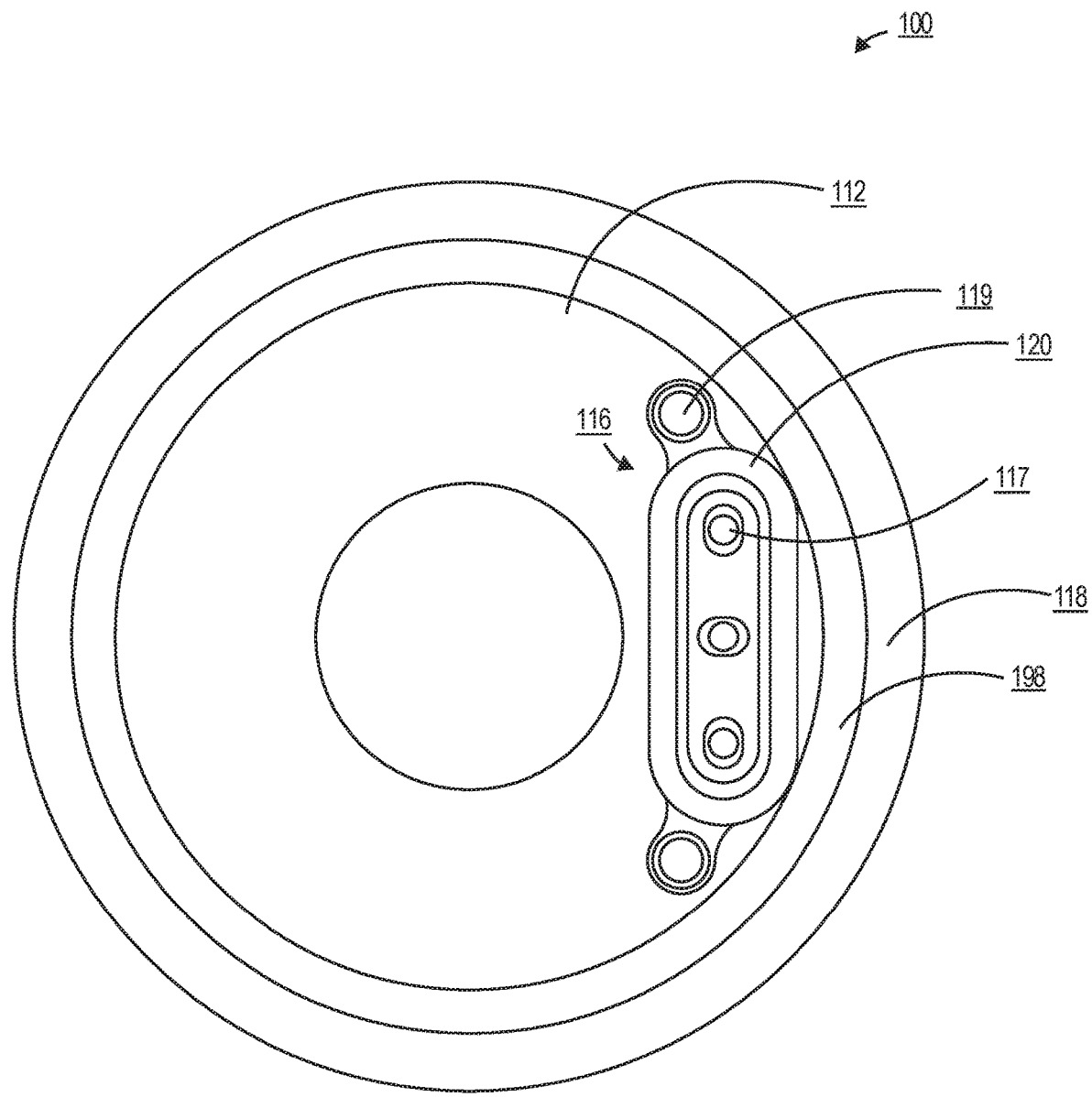
FIG. 4 is a diagram illustrating a top view of the force sensor apparatus of FIG. 1 after assembly.

FIG. 4 is a diagram illustrating a top view of the force sensor apparatus of FIG. 1 after assembly. From the top view of the force sensor apparatus, the mechanical orientation features (119), the pins (117) of the electrical connector assembly (116), the gasket (120), the interface structure (118), and the housing (112) are visible.

Figure 5A:
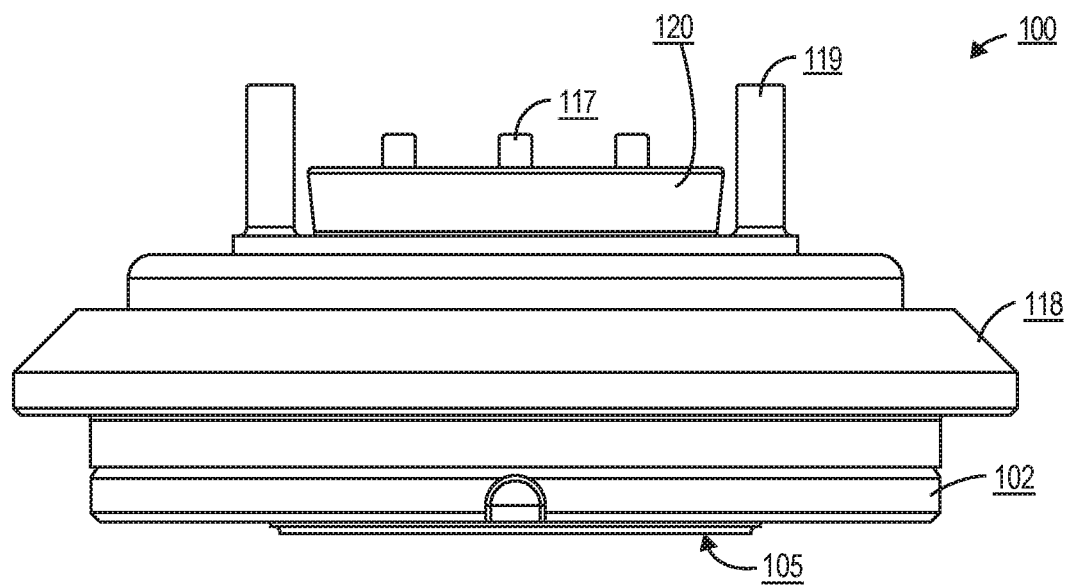
FIG. 5A is a diagram illustrating a side view of the force sensor apparatus of FIG. 1 after assembly.
Figure 5B:
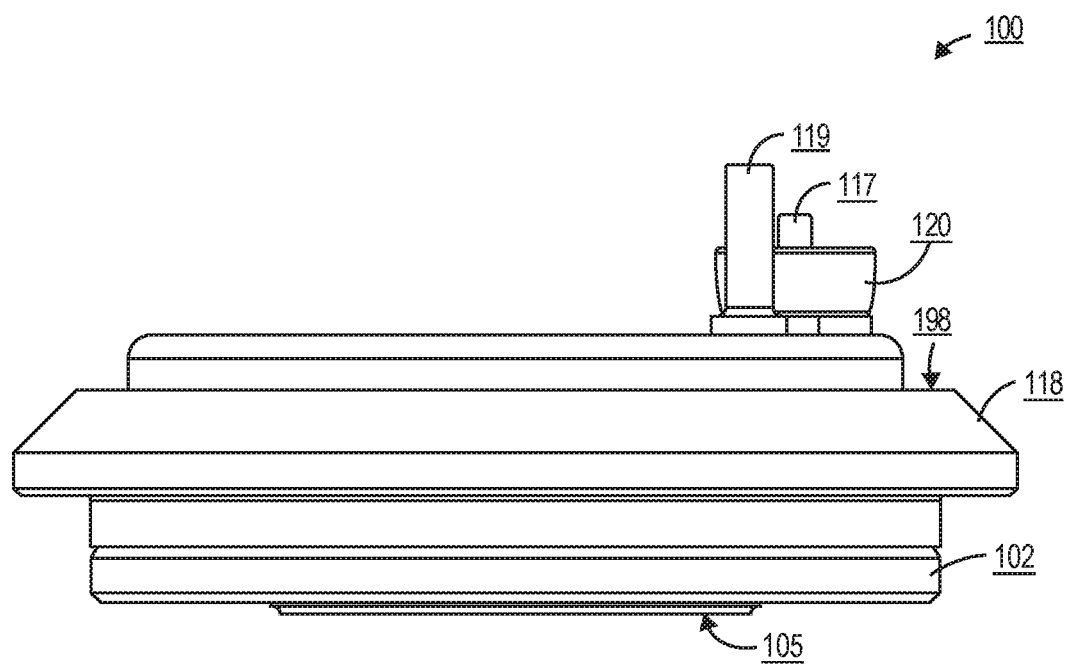
FIG. 5B is a diagram illustrating a side view of the force sensor apparatus of FIG. 1 after assembly.

FIG. 5A and FIG. 5B are diagrams each illustrating a side view of the force sensor apparatus of FIG. 1 after assembly. From the side view of the force sensor apparatus, the mechanical orientation features (119), the pins (117) of the electrical connector assembly (116), the gasket (120), the interface structure (118), and the housing (112) are visible. The force-receiving application surface (105) of the force-compliant element (102) is also visible.

Figure 6:
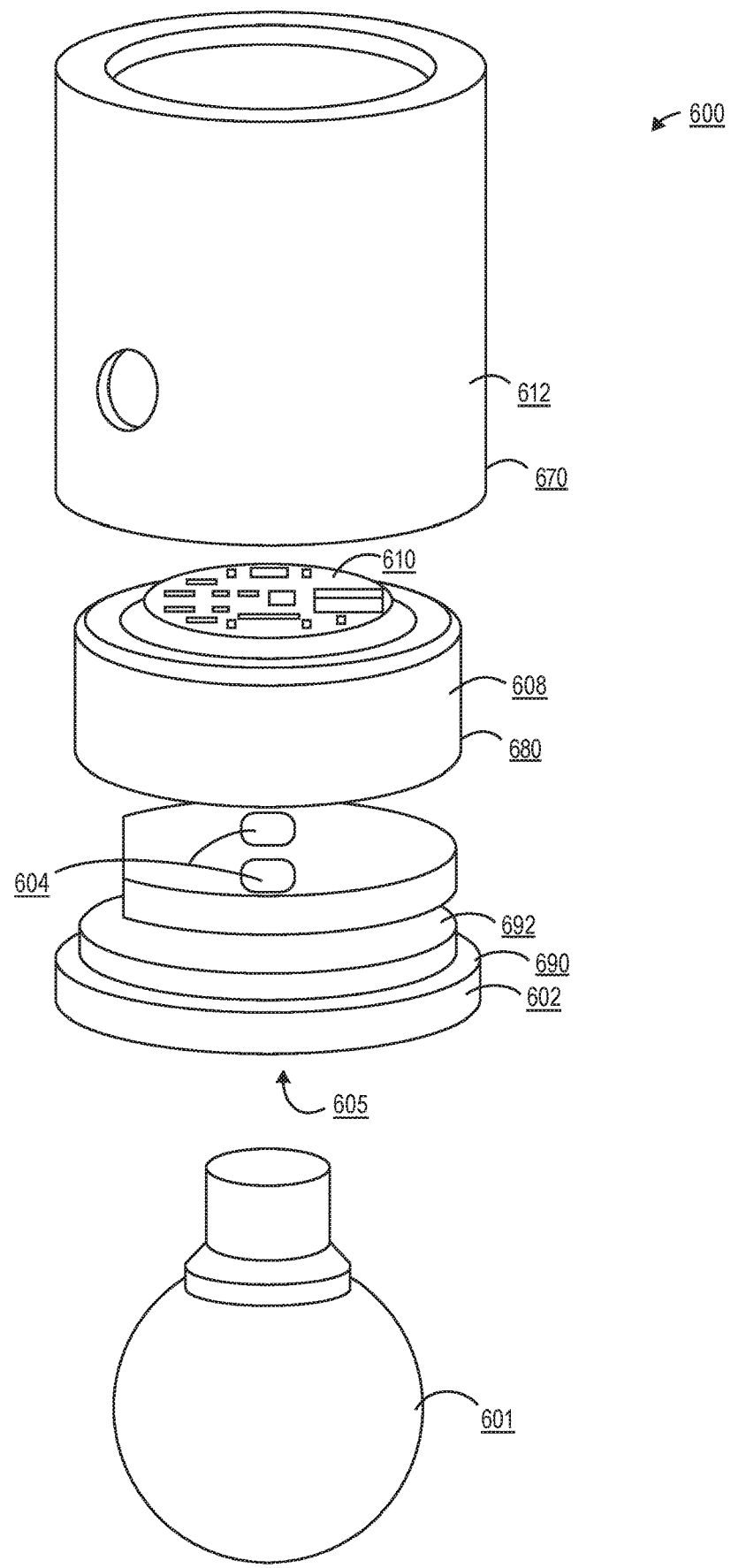
FIG. 6 is a diagram illustrating an exploded view of a force sensor apparatus according to embodiments of the present disclosure.

FIG. 6 is a diagram illustrating an exploded view of a force sensor apparatus (600) according to embodiments of the present disclosure. As will be explained below, the apparatus (600) of FIG. 6 includes many components that are similar to the components of the apparatus (100) of FIG. 1 but are configured and shaped to create a more cylindrical-shaped sensor assembly.

The apparatus (600) of FIG. 6 includes a force-compliant element (602) arranged to receive oppositely directed forces. In a particular embodiment, the force-compliant element (602) is a component of material, such as metal or plastic, that deforms in response to applications of forces. For example, the force-compliant element (602) may be a button-shaped metal disk. Readers of skill in the art will realize that the force-compliant element (602) may be produced using a variety of methods and techniques including but not limited to turned and milled and metal injection molding.

The apparatus (600) of FIG. 6 also includes two sensing elements (604) coupled to the force-compliant element (602). In a particular embodiment, the top surface of the force-compliant element (602) is prepared to provide a good attachment surface for the sensing elements (604). Each of the sensing elements (604) is configured to generate a signal indicating the degree that the force-compliant element (602) deforms in response to the application of oppositely directed forces. These signals from the sensing elements (604) may be transmitted through electrical connections (750) and may be used by the PCB (610) and other components (not pictured) coupled to the PCB. In a particular embodiment, the sensing elements are micro-fused silicon strain gauges (MSG). In order to measure the amount of force applied to the force-compliant element, the sensing elements may be evenly distributed on a circle on a top surface of the force-compliant element (602). Readers of skill in the art will realize that any number of sensing elements may be used in accordance with the present disclosure.

The PCB (610) includes electrical components (integrated circuits, and passive elements such as resistors, capacitors, etc.) that are positioned and configured to receive the signals from the sensing elements (604).

In the force sensor apparatus (600) of FIG. 6, the support structure (608) has a surface on which the PCB (610) is coupled. The support structure may be made of many types of material, such as metal and plastic, that are suitable for supporting the PCB (610). In the example of FIG. 6, the support structure (608) is positioned in a stack of the components of the force sensor apparatus (600) to rest on the force-compliant element (602). For example, in the assembled state, an outer rim (680) of the support structure (608) is coupled to an outer rim (692) of the force-compliant element (602). The support structure (608) may also include openings (not pictured) through which the components of the PCB may be coupled to the sensing elements. In this example, the openings in the support structure (608) may align with positions of bonding pads on the PCB (610), so that the contacts on the sensing elements (604) may be bonded to the bonding pads on the PCB (610). After forming this electrical connection of the sensing elements (604) to the electrical components on the PCB (610), the sensing elements (604) may be covered with a protective material (e.g., a gel like material) in the voids provided by the openings in the support structure (608).

In addition, the apparatus (600) of FIG. 6 also includes a sensor housing (612) that covers the PCB (610) and the support structure (608). The sensor housing (612) is designed to protect the electrical components of the force sensor apparatus (600) and receive the counterforce for force measurement. Although not pictured, the apparatus (600) of FIG. 6 may also include an electronical connector that is aligned for positioning within an opening of the sensor housing (612). In the assembled state, an outer rim (670) of the sensor housing (612) is coupled to an outer rim (690) of the force-compliant element (602), such that any force applied to the housing (612) is then applied or "flows" through the housing and contacts outer rim (690) of the force-compliant element (602).

The apparatus (600) of FIG. 6 also includes an application specific bottom interface (601) that distributes a load to the force-compliant element (602) when the application specific bottom interface (601) is attached to the force-compliant element (602), so that the sensing elements (604) can accurately measure the load on the force-compliant element (602). The application specific bottom interface (601) may also be used to create an interface for coupling the force sensor apparatus (600) to a component that provides the force to the force-compliant element (602). For example, the application specific bottom interface (601) may be used to couple the force sensor apparatus (600) to a piston of an electromechanical braking system.

Readers of skill in the art will realize that both the application specific bottom interface (601) and the sensor housing (612) may be adapted and modified to integrate the apparatus (600) to any component in a new or existing assembly to either directly measure a force or measure a reaction force associated with a force. For example, in a typical brake pedal assembly, a push rod may extend from the floorboard area in front of the engine compartment. At one end of the push rod, the push rod is coupled to a swivel attached to the floorboard. A foot pedal may be attached to the other end of the push rod. At a point between the two ends of the push rod, the push rod is coupled to a piston that is coupled to the braking system. In this example brake pedal assembly, the apparatus (600) may be integrated into a variety of locations. For example, the sensor apparatus described in the present disclosure may be coupled to the brake pedal to measure either tensile or compression force applied as a user depresses the pedal. Alternatively, the sensor apparatus of the present disclosure may also be coupled to measure the forces at the connection between the push rod and the piston, the connection between the push rod and the floorboard, and the force that is applied to the floorboard.

In a particular embodiment, the force-compliant element (602) and the application specific bottom interface (601) are a single assembly. Alternatively, the force-compliant element (602) and the application specific bottom interface (601) are two separate components coupled together. According to one implementation, the force-compliant element (602) and the application specific bottom interface (601) are two separate components crimped together. In a particular embodiment, the force-compliant element (602) and the application specific bottom interface (601) are fitted together through a thermal-shrink and expansion process. The force-compliant element (602) and the application specific bottom interface (601) may be welded together. In the example of FIG. 6, the application specific bottom interface (601) is a ball shaped interface. Readers of skill in the art will realize that any number of shapes and sizes may be used for the application specific bottom interface to provide a connection to a component through which a force is applied. The force-compliant element (602) and the housing (612) may be made using metal injection molding. Alternatively, the force-compliant element (602) and the housing (612) are made using milling and turning.

Figure 7:
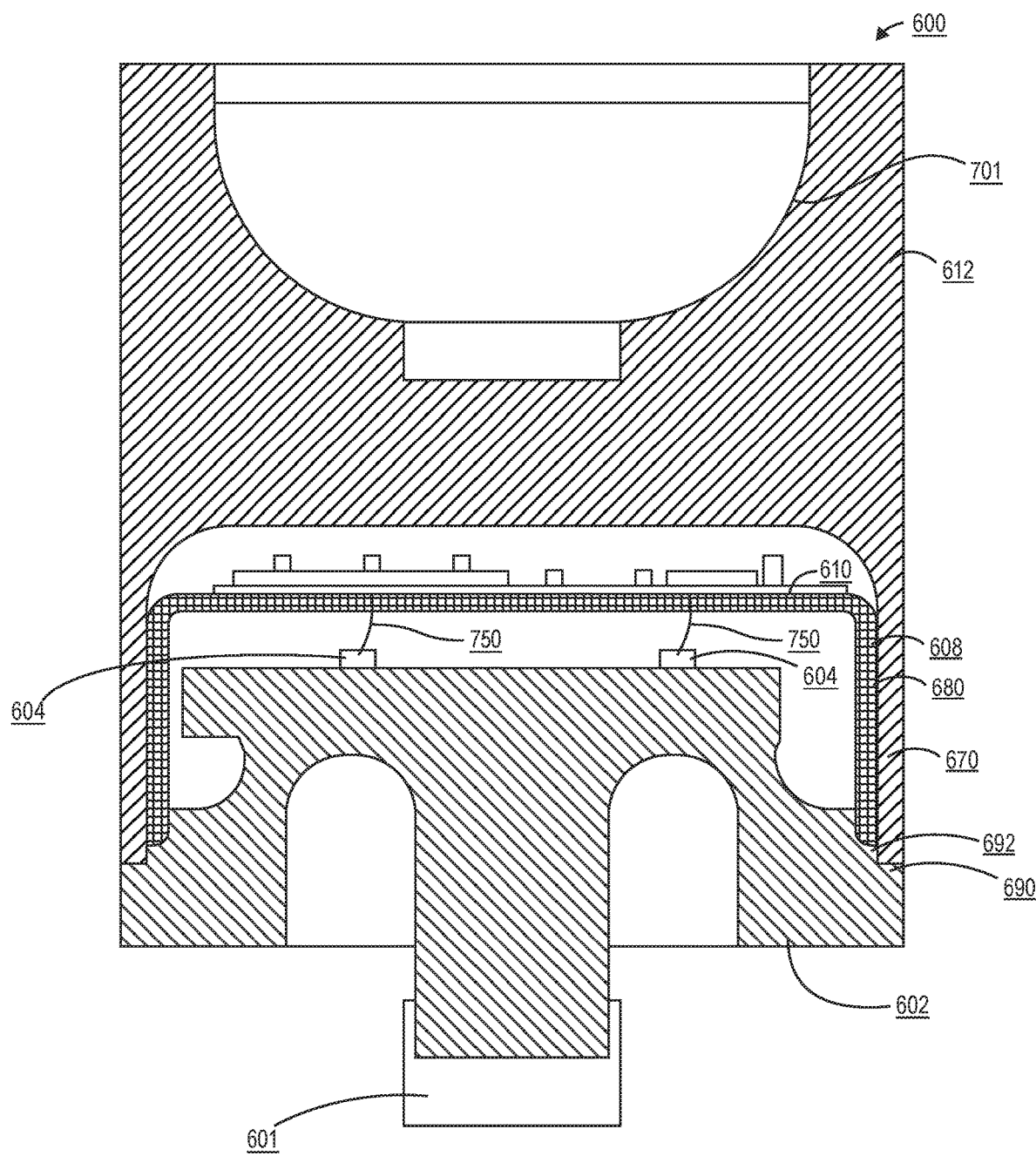
FIG. 7 is a diagram illustrating a partial cross-section view of the force sensor apparatus of FIG. 6 after assembly.

FIG. 7 is a diagram illustrating a partial cross-section view of the force sensor apparatus of FIG. 6 after assembly. Assembling the force sensor apparatus (600) may include attaching the printed circuit board (PCB) (610) having electrical components to the support structure (608). For example, the PCB (610) may be attached to the support structure using glue, adhesive, or tape. Assembling the force sensor apparatus may also include electrically coupling the electrical components of the PCB (610) to the sensing elements (604) on the force measuring element (602). As explained above, the sensing elements (604) may be configured to measure forces applied to the force-compliant element (602). To assemble the force sensor apparatus, an outer rim (680) of the support structure (608) may be attached to the outer rim (692) of the force-compliant element (602). In the example of FIG. 7, the housing (612) is positioned over the PCB (610) and the support structure (608) and an outer rim (670) of the housing (612) is attached to another outer rim (690) of the force-compliant element (602). In a particular embodiment, attaching the sensor housing (612) to the force-compliant element (602) may be carried out by one or more of welding, press-fitting, or using an adhesive. The housing (612) has an application specific interface (701) that includes a half ball shape with an alignment feature for coupling with another component.

Figure 8:
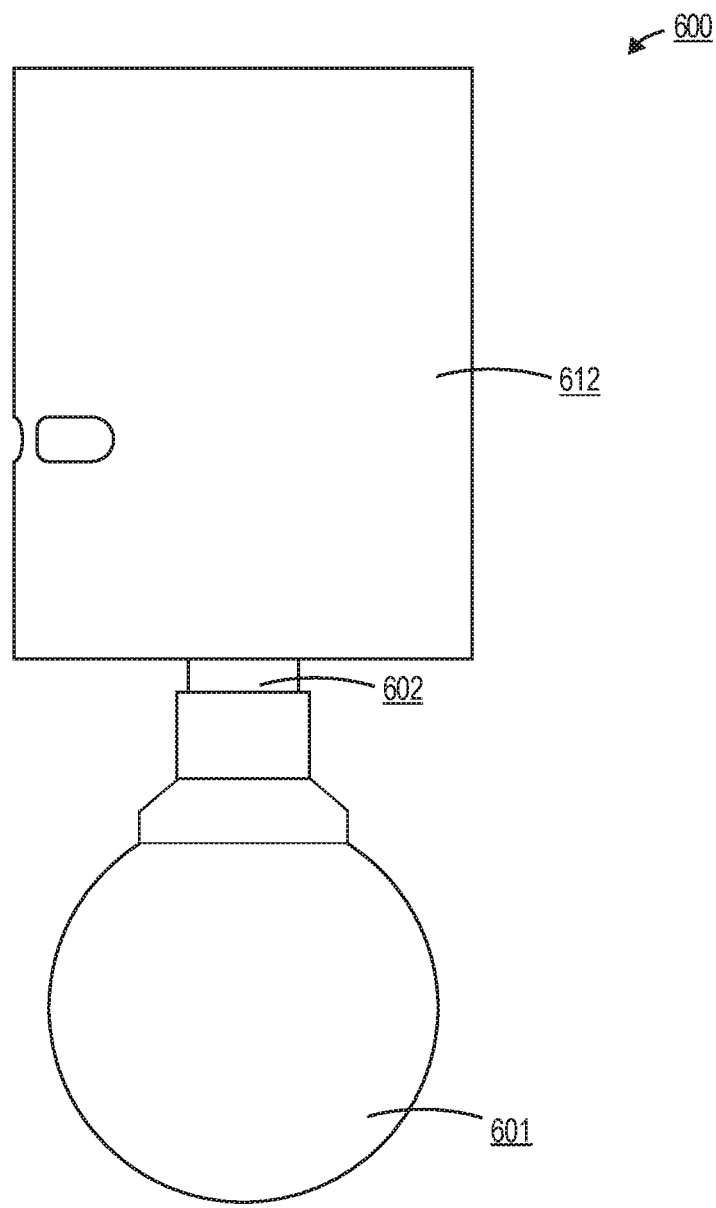
FIG. 8 is a diagram illustrating a side view of the force sensor apparatus of FIG. 6 after assembly.

FIG. 8 is a diagram illustrating a side view of the force sensor apparatus of FIG. 6 after assembly. In the assembled state, the force-compliant element (602) is visible, as well as the housing (612) and the application specific bottom interface (601).

Figure 9:
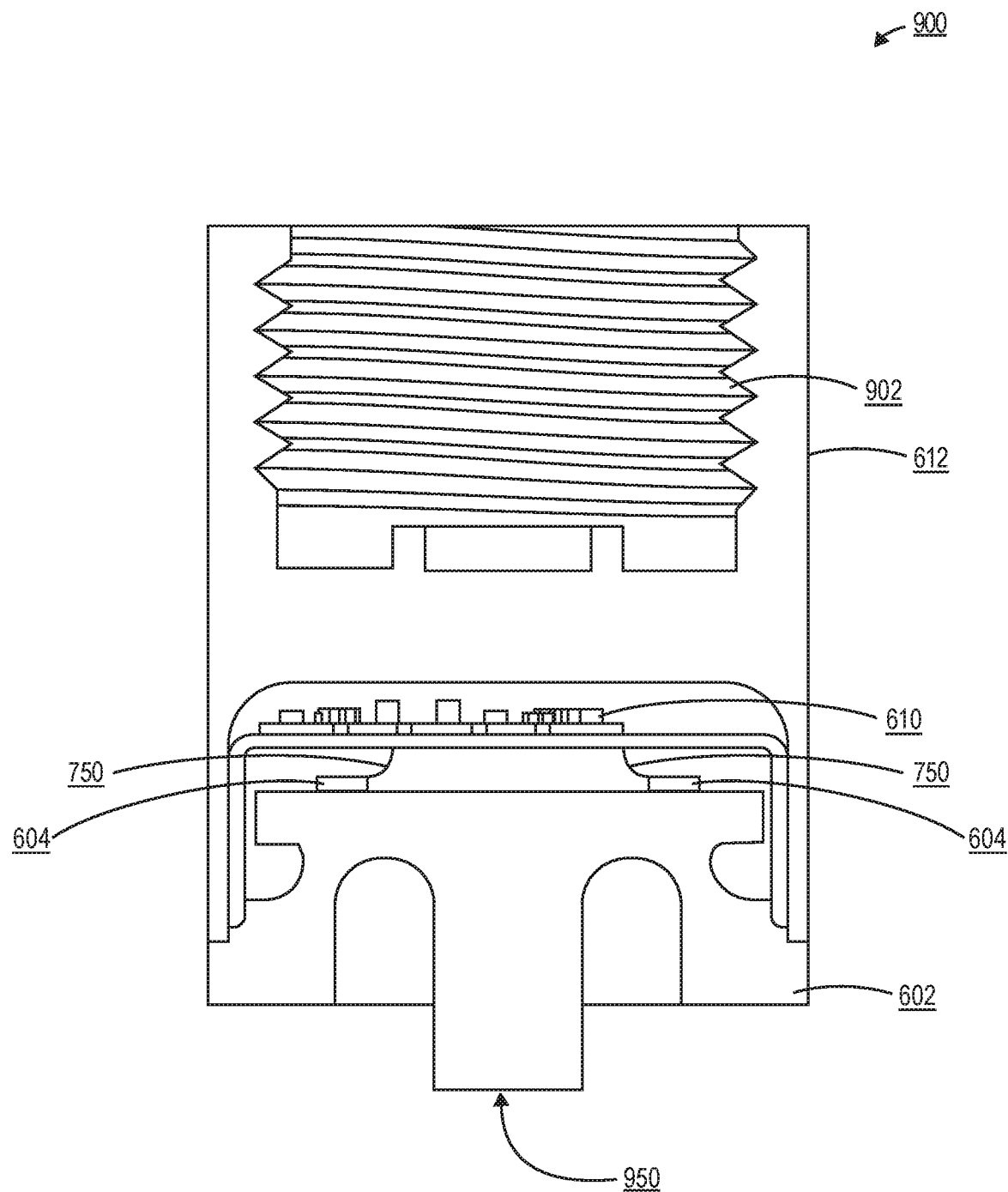
FIG. 9 is a diagram illustrating a partial cross-section view of a force sensor apparatus.

FIG. 9 is a diagram illustrating a partial cross-section view of a force sensor apparatus (900). The apparatus (900) includes many of the components of the apparatus (600) of FIG. 6 including the housing (612), the PCB (610), the sensing elements (604), and the force-compliant element (602). In the example of FIG. 9, the housing (612) has an application specific interface that includes internal threads (902). The internal threads (902) of the sensor housing (612) may be useful for coupling the force sensor apparatus (900) to a component such that the housing (612) may receive from the component, a counter force to the force that is applied to the bottom surface (950) of the force-compliant element (602). As explained above, because the housing (612) is coupled to the force-compliant element (602), the counter force that is applied to the housing "flows" through the housing (612) to the force-compliant element (602). In this example, the force-compliant element (602) may temporarily deform in response to a first force from the application specific interface (902) and a second force from the housing (612). Continuing with this example, the sensing elements (604) on the force-compliant element (602) may generate signals that are indicative of the amount of deformation in the force-compliant element (602). These signals from the sensing elements (604) may be transmitted through the electrical connections (750) and may be used by the PCB (610) and other components (not pictured) coupled to the PCB to determine the amount of the forces applied to the force-compliant element (602).

Figure 10:
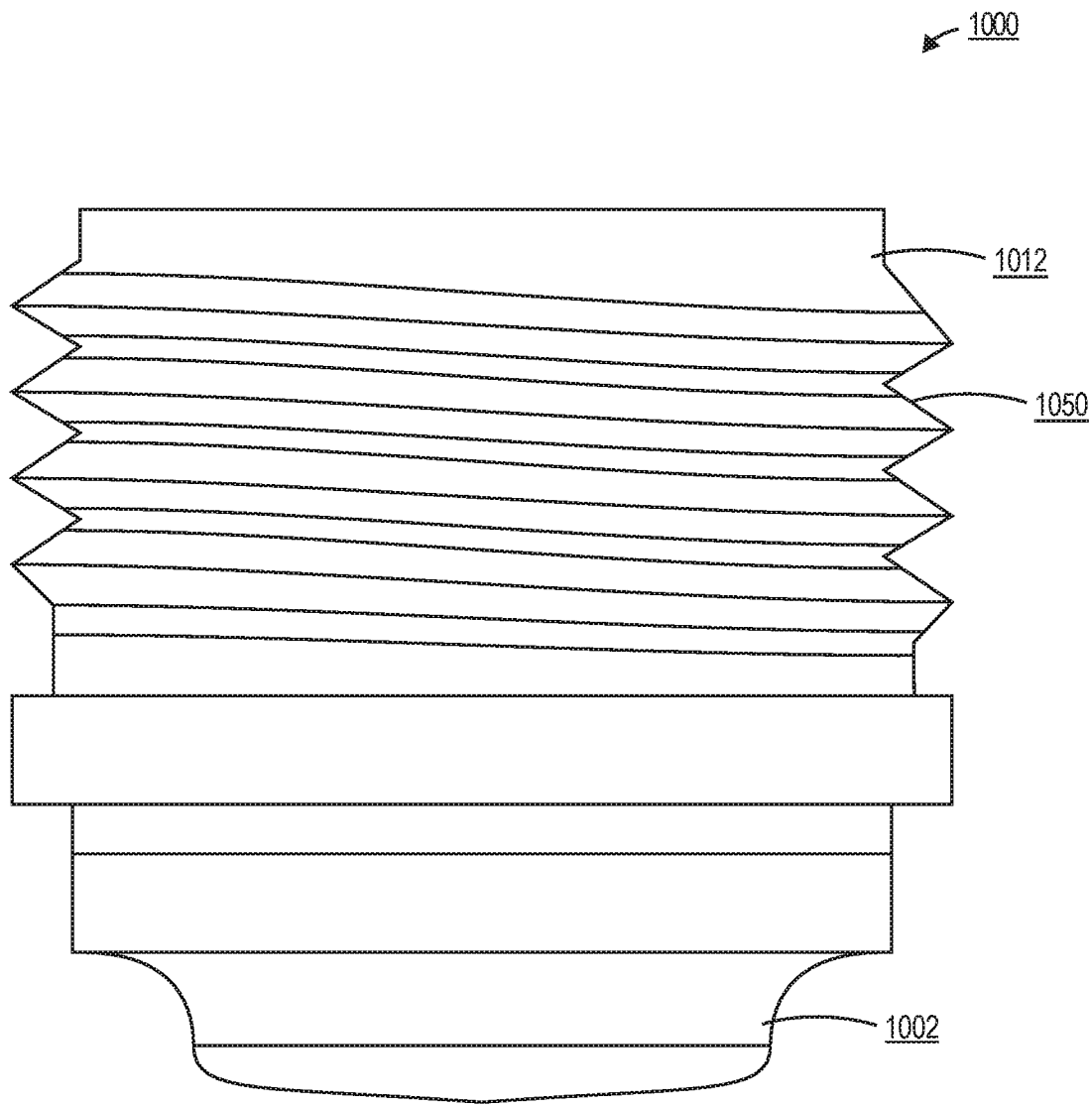
FIG. 10 is a diagram illustrating a side view of a force sensor apparatus according to embodiments of the present invention.

FIG. 10 is a diagram illustrating a side view of a force sensor apparatus (1000) after assembly, according to a particular embodiment of the present invention. In the example of FIG. 10, a force-compliant element (1002) similar to the force-compliant element (602) of FIGS. 6-9 is coupled to a housing (1012) that is similar to the housing (612) of FIGS. 6-9 except that the housing (1012) of FIG. 10 includes external threads (1050) for coupling the force sensor apparatus (1000) to a component.

Figure 11:
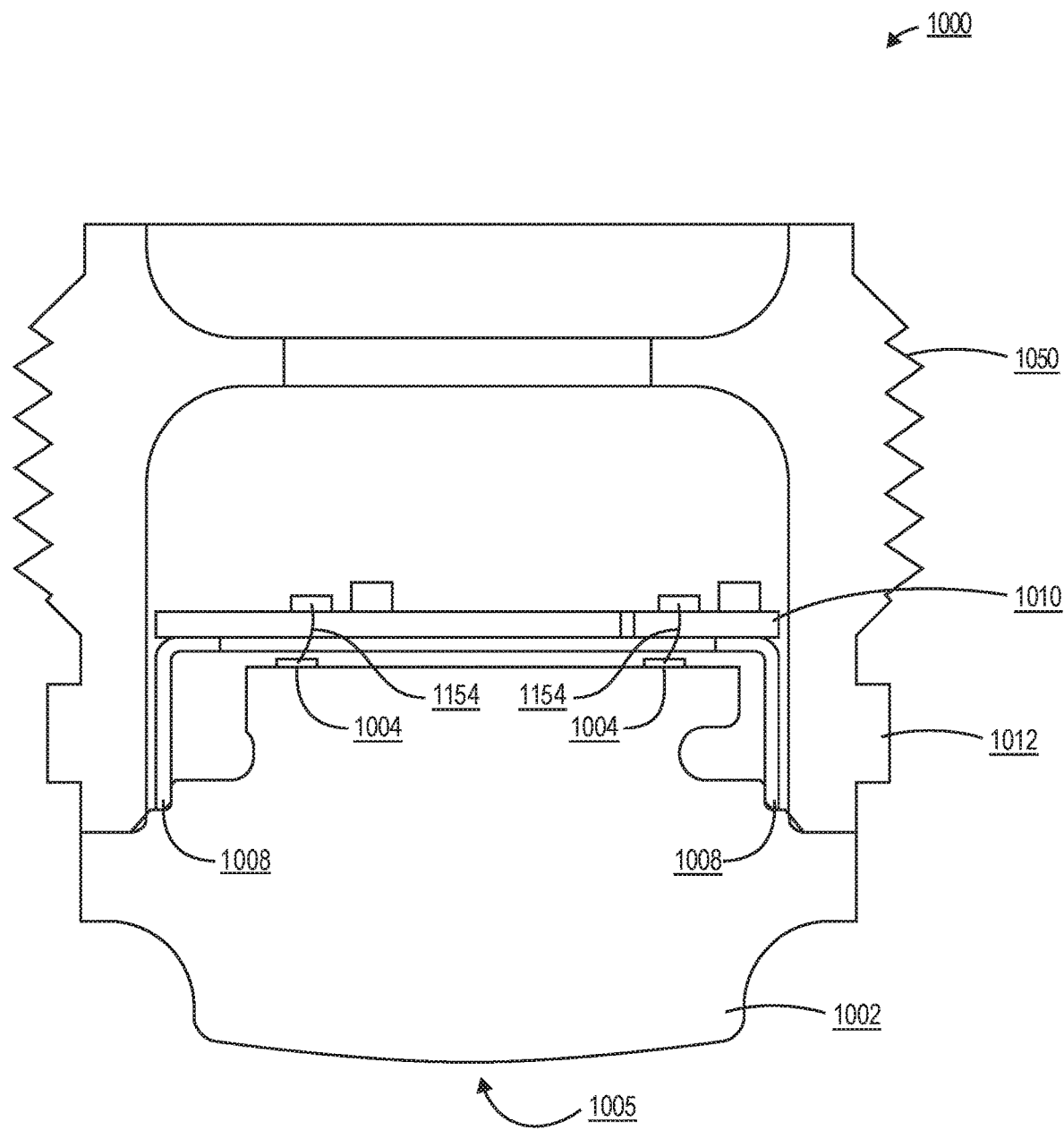
FIG. 11 is a diagram illustrating a partial cross-section view of the force sensor apparatus of FIG. 10.

FIG. 11 is a diagram illustrating a partial cross-section view of the force sensor apparatus (1000) of FIG. 10. The apparatus (1000) of FIG. 11 includes a force-compliant element (1002) having a force-receiving application surface (1005) arranged to receive oppositely directed forces. In a particular embodiment, the force-compliant element (1002) is a piece of material, such as metal or plastic, that deforms in response to applications of forces. For example, the force-compliant element (1002) may be a button-shaped metal disk. Readers of skill in the art will realize that the force-compliant element (1002) may be produced using a variety of methods and techniques including but not limited to turned and milled; and metal injection molding.

The apparatus (1000) of FIG. 11 also includes two sensing elements (1004) coupled to the force-compliant element (1002). In a particular embodiment, the top surface of the force-compliant element (1002) is prepared to provide a good attachment surface for the sensing elements (1004). Each of the sensing elements (1004) is configured to generate a signal indicating the degree that the force-compliant element (1002) deforms in response to the application of forces to apparatus (1000). These signals from the sensing elements (1004) may be transmitted through electrical connections (1154) and may be used by a printed circuit board (PCB) (1010) and other components (not pictured) coupled to the PCB (1010). In a particular embodiment, the sensing elements are micro-fused silicon strain gauges (MSG). In order to measure the amount of forces applied to the force-compliant element (1002), the sensing elements may be evenly distributed on a circle on a top surface of the force-compliant element (1002). Readers of skill in the art will realize that any number of sensing elements may be used in accordance with the present disclosure.

The PCB (1010) may include electrical components (integrated circuits, and passive elements such as resistors, capacitors, etc.) that are positioned and configured to receive the signals from the sensing elements (1004).

In the force sensor apparatus (1000) of FIG. 11, the support structure (1008) has a surface on which the PCB (1010) is coupled. The support structure may be made of many types of material, such as metal and plastic, that are suitable for supporting the PCB (1010). In the example of FIG. 11, the support structure (1008) is positioned in a stack of the components of the force sensor apparatus (1000) to rest on the force-compliant element (1002). The support structure (1008) may also include openings (not pictured) through which the components of the PCB may be coupled to the sensing elements. In this example, the openings in the support structure (1008) may align with positions of bonding pads on the PCB (1010), so that the contacts on the sensing elements (1004) may be bonded to the bonding pads on the PCB (1010). After forming this electrical connection of the sensing elements (1004) to the electrical components on the PCB (1010), the sensing elements (1004) may be covered with a protective material (e.g., a gel like material) in the voids provided by the openings in the support structure (1008).

In the example of FIG. 11, the sensor housing (1012) covers the PCB (1010) and the support structure (1008). The sensor housing (1012) is designed to protect the electrical components of the force sensor apparatus (1000). Although not pictured, the apparatus (1000) of FIG. 11 may also include an electronical connector that is aligned for positioning within an opening of the sensor housing (1012). As discussed above in relation to the sensor housing (612) of FIG. 6, the sensor housing (1012) of FIG. 11 also is configured for coupling to a component of a system and receiving from the component, a counter force to the force that is applied to the bottom surface of the force-compliant element (1002). In the example of FIG. 11 the housing (1012) includes the external threads (1050) which help fasten the housing to another component.

Figure 12:
FIG. 12 is a flowchart to illustrate an implementation of a method for constructing a force sensor apparatus according to embodiments of the present disclosure.
Figure 12:
Figure 12:
Figure 12:

FIG. 12 is a flowchart to illustrate an implementation of a method for constructing a force sensor apparatus according to embodiments of the present disclosure. The method of FIG. 12 includes attaching (1202) a printed circuit board (PCB) having electrical components to a support ring. Attaching (1202) a printed circuit board (PCB) having electrical components to a support ring may be carried out by soldering or applying an adhesive, tape, or glue to the bottom of a PCB (e.g., the PCB (110) of FIG. 1; the PCB (610) of FIG. 6; the PCB (610) of FIG. 9; and the PCB (1010) of FIG. 11) to the support ring (e.g., the support structure (108) of FIG. 1; the support structure (608) of FIG. 6; the support structure (608) of FIG. 9; and the support structure (1008) of FIG. 11).

The method of FIG. 12 also includes electrically coupling (1204 the electrical components of the PCB to at least two sensing elements on a force ring, the at least two sensing elements configured to measure a force applied to the force ring. Electrically coupling (1204) the electrical components of the PCB to at least two sensing elements on a force ring may be carried out by connecting a lead from the PCB (e.g., the PCB (110) of FIG. 1; the PCB (610) of FIG. 6; the PCB (610) of FIG. 9; and the PCB (1010) of FIG. 11) to the sensing elements (e.g., the sensing elements (104) of FIG. 1; the sensing elements (604) of FIG. 6; the sensing elements (604) of FIG. 9; and the sensing elements (1004) of FIG. 11) on the force ring (e.g., the force-compliant element (102) of FIG. 1; the force-compliant element (602) of FIG. 6; the force-compliant element (602) of FIG. 9; the force-compliant element (1002) of FIG. 11).

The method of FIG. 12 also includes attaching (1206 the support ring to the force ring. Attaching (1206) the support ring to the force ring may be carried out by welding, gluing, or otherwise coupling the force ring (e.g., the force-compliant element (102) of FIG. 1; the force-compliant element (602) of FIG. 6; the force-compliant element (602) of FIG. 9; the force-compliant element (1002) of FIG. 11) and the support structure (e.g., the support structure (108) of FIG. 1; the support structure (608) of FIG. 6; the support structure (608) of FIG. 9; and the support structure (1008) of FIG. 11).

In addition, the method of FIG. 12 also includes positioning (1208) a sensor cap over the PCB, the support ring, and the force ring. Positioning (1208) a sensor cap over the PCB, the support ring, and the force ring may be carried out by placing the sensor cap (e.g., the sensor housing (112) of FIG. 1; the sensor housing (612) of FIG. 6; the sensor housing (612) of FIG. 9; and the sensor housing (1012) of FIG. 11) above the PCB (e.g., the PCB (110) of FIG. 1; the PCB (610) of FIG. 6; the PCB (610) of FIG. 9; and the PCB (1010) of FIG. 11), the support ring (e.g., the support structure (108) of FIG. 1; the support structure (608) of FIG. 6; the support structure (608) of FIG. 9; and the support structure (1008) of FIG. 11), and the force ring (e.g., the force-compliant element (102) of FIG. 1; the force-compliant element (602) of FIG. 6; the force-compliant element (602) of FIG. 9; the force-compliant element (1002) of FIG. 11).

Furthermore, the method of FIG. 12 also includes attaching (1210) the sensor cap to the force ring. Attaching (1210) the sensor cap to the force ring may be carried out by coupling the sensor cap (e.g., the sensor housing (112) of FIG. 1; the sensor housing (612) of FIG. 6; the sensor housing (612) of FIG. 9; and the sensor housing (1012) of FIG. 11) to the sensor housing (e.g., the force-compliant element (102) of FIG. 1; the force-compliant element (602) of FIG. 6; the force-compliant element (602) of FIG. 9; and the force-compliant element (1002) of FIG. 11).

FIG. 13 is a flowchart to illustrate another implementation of a method for constructing a force sensor apparatus according to embodiments of the present disclosure. The method of FIG. 13 is similar to the method in FIG. 12 in that the method of FIG. 13 also includes attaching (1202) a printed circuit board (PCB) having electrical components to a support ring; electrically coupling (1204) the electrical components of the PCB to at least two sensing elements on a force ring, the at least two sensing elements configured to measure a force applied to the force ring; attaching (1206) the support ring to the force ring; positioning (1208) a sensor cap over the PCB, the support ring, and the force ring; and attaching (1210) the sensor cap to the force ring.

The method of FIG. 13 also includes placing (1302) a circular environmental seal between an inner rim of the sensor cap and an inner rim of the force ring. Placing (1302) a circular environmental seal between an inner rim of the sensor cap and an inner rim of the force ring may be carried out by positioning the environmental seal ring (e.g., the environmental seal ring (106) of FIG. 1) between the inner rim (e.g., the inner rim (180) of FIGS. 1-3) of the sensor cap (e.g., the sensor housing (112) of FIGS. 1-3) and the inner rim (e.g., the inner rim (160) of FIGS. 1-3) of the force ring (e.g., the force-compliant element (102) of FIGS. 1-3).

FIG. 14 is a flowchart to illustrate another implementation of a method for constructing a force sensor apparatus according to embodiments of the present disclosure. The method of FIG. 14 is similar to the method in FIG. 12 in that the method of FIG. 14 also includes attaching (1202) a printed circuit board (PCB) having electrical components to a support ring; electrically coupling (1204 the electrical components of the PCB to at least two sensing elements on a force ring, the at least two sensing elements configured to measure a force applied to the force ring; attaching (1206) the support ring to the force ring; positioning (1208) a sensor cap over the PCB, the support ring, and the force ring; and attaching (1210) the sensor cap to the force ring.

The method of FIG. 14 also includes attaching (1402) an interface ring to the force ring. In a particular embodiment, the interface ring is attached to the force ring before calibration of the force sensor apparatus. Attaching (1402) an interface ring to the force ring may be carried out by coupling the interface ring (e.g., the interface structure (118) of FIG. 1) to the force ring (e.g., the force-compliant element (102) of FIG. 1). For example, in a particular embodiment, the interface ring may be welded to the force ring.

The flowchart and diagrams in the Figures illustrate the architecture, functionality, and operation of possible implementations of apparatus and methods according to various embodiments of the present disclosure. In some alternative implementations, the functions noted in the blocks or step in the method may occur out of the order noted in the figures. For example, two blocks shown in succession may, in fact, be performed substantially concurrently, or the blocks may sometimes be performed in the reverse order, depending on the functionality involved.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A force sensor apparatus, comprising:
   a force-compliant element that deforms in response to applications of forces to the force sensor apparatus;
   a sensing element coupled to the force-compliant element and configured to generate a signal indicating the degree that the force-compliant element deforms in response to the application of forces to the force sensor apparatus;
   a printed circuit board configured to receive the signal from the sensing element;
   a support structure having a surface on which the printed circuit board is coupled, the support structure having an outer rim, the outer rim of the support structure attached to a first outer rim of the force-compliant element;
   a sensor housing that covers the printed circuit board, the sensor housing having an outer rim, the outer rim of the sensor housing attached to a second outer rim of the force-compliant element; and
   an interface structure that distributes a load to the force-compliant element, the interface structure having an inner rim, the inner rim of the interface structure attached to a third outer rim of the force-compliant element.

2. The apparatus of claim 1 further comprising:
   an environmental seal ring placed between an inner rim of the sensor housing and an inner rim of the force-compliant element.

3. The apparatus of claim 1 wherein an inner rim of the interface structure is welded to an outer rim of the force-compliant element.

4. The apparatus of claim 1 further comprising:
   an electronical connector assembly coupled to the PCB and extended through an opening of the sensor housing; and
   a seal between the electrical connector assembly and the sensor housing.

5. The apparatus of claim 4 further comprising orientation features for aligning the apparatus with a component.

6. The apparatus of claim 5, wherein the orientation features are part of at least one of the sensor housing and the electrical connector assembly.

7. The apparatus of claim 1 wherein the PCB is attached to the support structure by at least one of tape, adhesive, soldering, and glue.

8. The apparatus of claim 1 wherein the PCB is C-shaped such that a portion of the support structure is not covered by the PCB.

9. The apparatus of claim 1 wherein the force-compliant element and the support structure are ring shaped.

10. The apparatus of claim 1 wherein the force-compliant element and the support structure are cylindrical shaped.

11. The apparatus of claim 1 further comprising an application specific bottom interface for coupling a component to a force-compliant element.

12. The apparatus of claim 11 wherein the force-compliant element and the application specific bottom interface are a single assembly.

13. The apparatus of claim 11 wherein the force-compliant element and the application specific bottom interface are two separate components coupled together.

14. The apparatus of claim 11 wherein the force-compliant element and the application specific bottom interface are two separate components crimped together.

15. The apparatus of claim 11 wherein the force-compliant element and the application specific bottom interface are fitted together through a thermal-shrink and expansion process.

16. The apparatus of claim 11 wherein the application specific bottom interface is a ball shaped interface.

17. The apparatus of claim 1 wherein the sensing element includes a plurality of gauges.

18. The apparatus of claim 17 wherein the plurality of gauges is placed on top of the force-compliant element with the gauges evenly distributed around the circumference of the force-compliant element.

19. The apparatus of claim 1 wherein the sensor housing is attached to the force-compliant element by at least one of: welding, press-fitting, and an adhesive.

20. The apparatus of claim 1 wherein the sensor housing has an application specific interface that includes a half ball shape with an alignment feature for coupling with another component.

21. The apparatus of claim 1 wherein the sensor housing has an application specific interface that includes at least one of external threads and internal threads.

22. The apparatus of claim 1 wherein the force-compliant element and the sensor housing are made using milling and turning.

23. The apparatus of claim 1 wherein the force-compliant element includes at least one groove on the surface on which the sense element is attached.

24. The apparatus of claim 1 wherein the support structure supports the PCB.

25. A force sensor apparatus, comprising:
   a force ring configured to deform in response to applications of forces to the force sensor apparatus, the force ring having a plurality of sensing elements configured to produce an electrical signal that is indicative of the amount of deformation in the force ring;
   a printed circuit board configured to process the electrical signal from the force ring;

a sensor cap covering the printed circuit board and a portion of the force ring, the sensor cap having an inner rim and an outer rim, the outer rim of the sensor cap attached to the force ring;

a circular environmental seal between the inner rim of the sensor cap and the inner rim of the force ring; and a glass sealed connector that provides an electrical contact to the printed circuit board through the sensor cap.

26. The apparatus of claim 25 further comprising:

a support ring placed between the printed circuit board and the force ring, wherein the printed circuit board is coupled to the support ring, the support ring coupled to the force ring.

27. The apparatus of claim 25 further comprising:

an interface ring that distributes a load to the force ring, the interface ring coupled to the force ring.

28. The apparatus of claim 25 further comprising a gasket that is coupled to the glass-sealed connector.

29. A method of assembling a force sensor apparatus, the method comprising:

attaching a printed circuit board (PCB) having electrical components to a support ring;

electrically coupling the electrical components of the PCB to at least two sensing elements on a force ring, the at least two sensing elements configured to measure forces applied to the force sensor apparatus;

attaching the support ring to the force ring;

positioning a sensor cap over the PCB, the support ring, and the force ring;

attaching the sensor cap to the force ring; and attaching an interface ring to the force ring and such that the interface ring is positioned around the sensor cap, the interface ring for distributing a load to the force ring.

30. The method of claim 29 further comprising:

placing a circular environmental seal between an inner rim of the sensor cap and an inner rim of the force ring.

31. The method of claim 29 wherein the interface ring is attached to the force ring before calibration of the electrical components of the force sensor apparatus.

\* \* \* \* \*